United States Patent
Gouko et al.

(10) Patent No.: US 10,788,379 B2
(45) Date of Patent: Sep. 29, 2020

(54) ABNORMALITY DIAGNOSIS APPARATUS

(71) Applicant: DENSO CORPORATION, Kariya, Aichi-pref. (JP)

(72) Inventors: Norio Gouko, Kariya (JP); Atusi Sakaida, Kariya (JP); Toshihisa Taniguchi, Kariya (JP); Keiji Okamoto, Kariya (JP); Yoshihiko Shiraishi, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 246 days.

(21) Appl. No.: 15/775,761

(22) PCT Filed: Nov. 10, 2016

(86) PCT No.: PCT/JP2016/083305
§ 371 (c)(1),
(2) Date: May 11, 2018

(87) PCT Pub. No.: WO2017/082324
PCT Pub. Date: May 18, 2017

(65) Prior Publication Data
US 2018/0372560 A1    Dec. 27, 2018

(30) Foreign Application Priority Data
Nov. 12, 2015   (JP) ................ 2015-222446

(51) Int. Cl.
G01K 13/02       (2006.01)
G01K 17/20       (2006.01)
G01M 13/02       (2019.01)

(52) U.S. Cl.
CPC ............. *G01K 17/20* (2013.01); *G01M 13/02* (2013.01)

(58) Field of Classification Search
CPC .... G01N 25/72; G01N 25/00; G01N 25/4866; G01N 25/482; G01K 17/00; G01K 17/06;
(Continued)

(56) References Cited

U.S. PATENT DOCUMENTS 4,779,994 A    10/1988 Diller et al.
7,368,827 B2 *  5/2008 Kulkarni .................. F01D 15/10
                                                       290/52
(Continued)

FOREIGN PATENT DOCUMENTS

DE        102006016956 A1    10/2007
JP        H05301144 A        11/1993
(Continued)

*Primary Examiner* — Gail Kaplan Verbitsky
(74) *Attorney, Agent, or Firm* — Harness, Dickey & Pierce, P.L.C.

(57) ABSTRACT

An abnormality diagnosis apparatus includes a sensor unit configured to detect a heat flux which flows from a target apparatus toward outside, and a determining unit configured to determine an abnormality of the target apparatus. The sensor unit includes a first heat flux sensor, a second heat flux sensor, and a thermal buffer which is disposed between the first heat flux sensor and the second heat flux sensor and which has predetermined heat capacity. The first heat flux sensor outputs a first sensor signal in accordance with a heat flux which passes through the first heat flux sensor from the target apparatus side toward the thermal buffer side. The second heat flux sensor outputs a second sensor signal in accordance with a heat flux which passes through the second heat flux sensor from the thermal buffer side toward a side farther from the target apparatus. The determining unit determines whether or not there is an abnormality of the target apparatus on the basis of the first sensor signal and the second sensor signal.

6 Claims, 9 Drawing Sheets

(58) Field of Classification Search
CPC ...... G01K 13/002; G01K 13/02; G01K 17/08;
G01K 3/08; G01K 17/20; G01M 13/02
USPC ............... 252/962, 960, 964; 702/35, 40
See application file for complete search history.

(56) References Cited

U.S. PATENT DOCUMENTS

| | | | |
|---|---|---|---|
| 8,100,167 B2* | 1/2012 | Thybo | B60H 1/00978 |
| | | | 165/11.1 |
| 8,235,588 B2* | 8/2012 | Louban | B23K 11/36 |
| | | | 250/338.1 |
| 8,606,554 B2* | 12/2013 | Zimmermann | G05B 17/02 |
| | | | 700/276 |
| 9,995,699 B2* | 6/2018 | Delehouze | G01N 25/4866 |
| 10,209,209 B2* | 2/2019 | Ikeda | A61B 5/0008 |
| 10,578,496 B2* | 3/2020 | Gouko | G01K 3/14 |
| 2016/0141733 A1 | 5/2016 | Shiraishi et al. | |
| 2017/0211990 A1 | 7/2017 | Gouko et al. | |

FOREIGN PATENT DOCUMENTS

| | | |
|---|---|---|
| JP | 5376086 B1 | 12/2013 |
| WO | WO-2014196290 A1 | 12/2014 |

* cited by examiner

ABNORMALITY DIAGNOSIS APPARATUS

CROSS REFERENCE TO RELATED APPLICATIONS

This application is a U.S. National Phase application under 35 U.S.C. 371 of International Application No. PCT/JP2016/083305 filed on Nov. 10, 2016 and published in Japanese as WO 2017/082324 A1 on May 18, 2017. This application is based on and claims the benefit of priority from Japanese Patent Application No. 2015-222446 filed on Nov. 12, 2015. The entire disclosures of all of the above applications are incorporated herein by reference.

FIELD

The present disclosure relates to an abnormality diagnosis apparatus for diagnosing the presence or absence of an abnormality in a target apparatus.

BACKGROUND

As a heat flux sensor which detects a heat flux, there is a heat flux sensor disclosed in PTL 1, for example.

PATENT LITERATURE

PTL 1 JP 5376086 B

SUMMARY

The present inventors have studied an abnormality diagnosis apparatus which makes a diagnosis regarding an abnormality of a target apparatus which is a diagnostic target using a heat flux sensor, and have found the following problems.

At a target apparatus such as a productive facility, an operating state and a resting state are repeated. While the target apparatus is operating, heat is generated at the target apparatus by friction, vibration, or the like. While the target apparatus is in a resting state, heat generation at the target apparatus is stopped. Therefore, if an operating state and a resting state of the target apparatus are repeated, a waveform of a heat flux generated from the target apparatus becomes a waveform in which increase and decrease are repeated over time. If the target apparatus operates normally, the heat flux generated from the target apparatus changes within a predetermined range. On the other hand, if an abnormality occurs at the target apparatus, the heat flux generated from the target apparatus falls outside the predetermined range.

Therefore, the abnormality diagnosis apparatus includes a heat flux sensor and a determining unit. The heat flux sensor detects the hear flux generated from the target apparatus. The determining unit determines whether or not a detection value of the heat flux sensor falls within the predetermined range. According to this abnormality diagnosis apparatus, it is possible to diagnose a state of the target apparatus as abnormal when the detection value falls outside the predetermined range.

However, if an environmental temperature around the target apparatus changes, the heat flux detected by the heat flux sensor changes by being affected by the environmental temperature. Therefore, in a case where a conventional heat flux sensor is used, there is a possibility that the detection value may fall outside the predetermined range even if the state of the target apparatus is normal, and the abnormality diagnosis apparatus may erroneously diagnose the state of the target apparatus as abnormal. Further, if a wide predetermined range is set in view of influence of the environmental temperature, there is a possibility that the state may be erroneously diagnosed as normal even if the state of the target apparatus is abnormal.

In view of the above-described points, an object of the present disclosure is to provide an abnormality diagnosis apparatus capable of making a diagnosis regarding an abnormality of a target apparatus with high accuracy.

A first aspect according to an abnormality diagnosis apparatus is an abnormality diagnosis apparatus which makes a diagnosis regarding an abnormality of a target apparatus, the apparatus includes a sensor unit provided at the target apparatus and configured to detect a heat flux which flows outward from the target apparatus, and a determining unit configured to detect an abnormality of the target apparatus, the sensor unit including a first heat flux sensor, a second heat flux sensor disposed on a side farther from the target apparatus than the first heat flux sensor is, and a thermal buffer disposed between the first heat flux sensor and the second heat flux sensor and having a predetermined heat capacity, the first heat flux sensor outputting a first sensor signal in accordance with a heat flux which passes through the first heat flux sensor from the target apparatus side toward the thermal buffer side, the second heat flux sensor outputting a second sensor signal in accordance with a heat flux which passes through the second heat flux sensor from the thermal buffer side toward an opposite side to the thermal buffer side, and the determining unit determining whether or not there is an abnormality of the target apparatus on the basis of the first sensor signal and the second sensor signal.

In this abnormality diagnosis apparatus, in the sensor unit, the thermal buffer is disposed between the first heat flux sensor and the second heat flux sensor. Therefore, when the heat flux emitted from the target apparatus changes, the heat flux which passes through the second heat flux sensor moderately changes later than the change of the heat flux which passes through the first heat flux sensor. It is therefore possible to detect the change of the heat flux emitted from the target apparatus from a difference between the first sensor signal and the second sensor signal.

The first heat flux sensor and the second heat flux sensor are disposed on both sides of the thermal buffer, and disposed at positions relatively close to each other. Further, change of the environmental temperature which is a temperature in an environment in which the sensor unit is provided normally occurs moderately over a long period of time. Therefore, the first heat flux sensor and the second heat flux sensor are affected by the environmental temperature in the same way or in almost exactly the same way. The first heat flux sensor and the second heat flux sensor respectively output sensor signals in accordance with the heat fluxes which are affected by the environmental temperatures which are the same or which are almost exactly the same. It is therefore possible to eliminate or reduce influence by the environmental temperature on the detection result of the sensor unit by using the both sensor signals.

As a result, according to the abnormality diagnosis apparatus of the present disclosure, it is possible to make a diagnosis regarding an abnormality of a target apparatus with high accuracy.

DRAWINGS

DESCRIPTION

Figure 1:
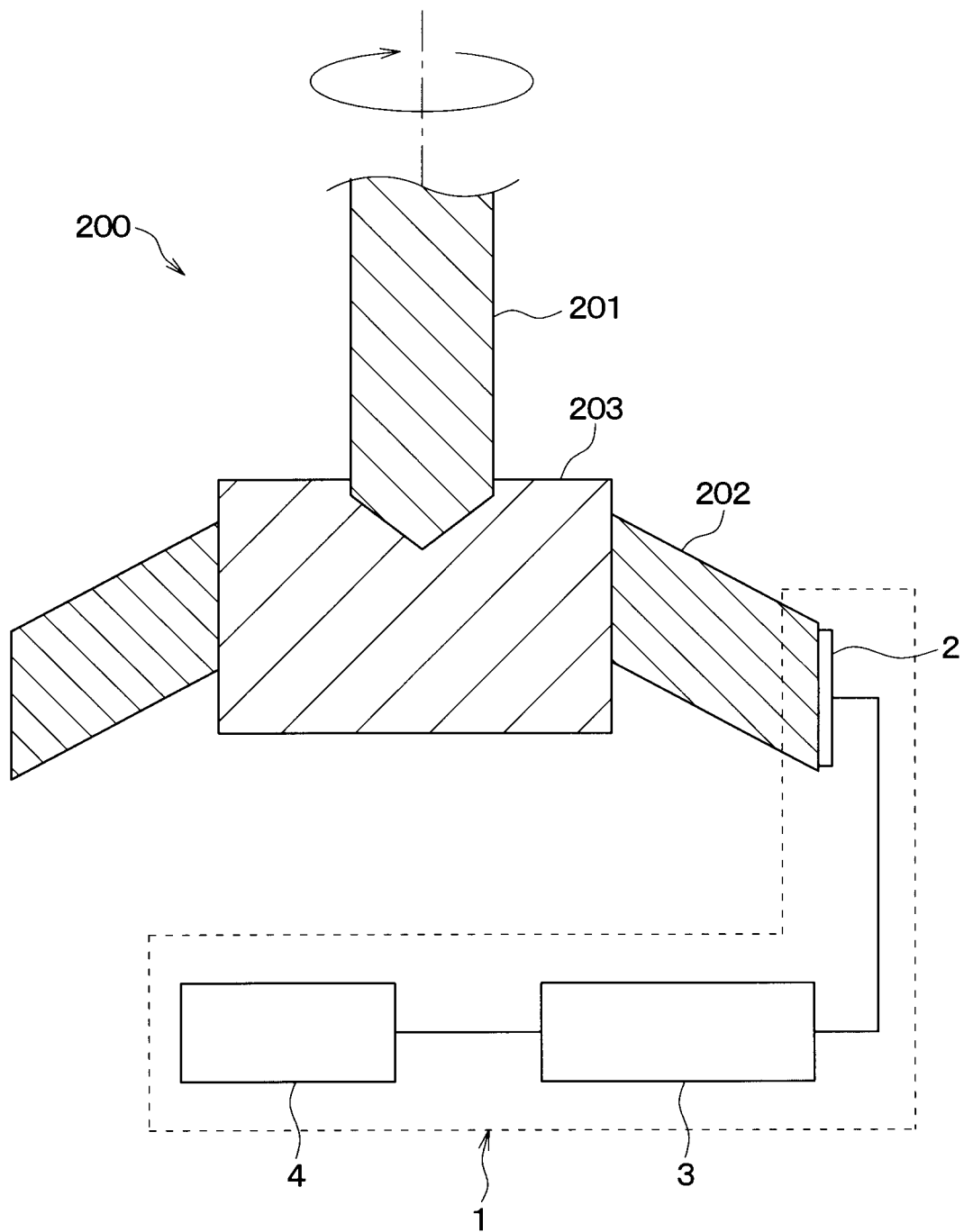
FIG. 1 is a diagram illustrating configurations of an automatic cutting machine and an abnormality diagnosis apparatus in a first embodiment.

Embodiments of the present disclosure will be described below on the basis of the drawings. Note that, in the following embodiments, description will be provided while the same reference numerals are assigned to portions which are the same as or equivalent to each other.

First Embodiment

As illustrated in FIG. 1, an abnormality diagnosis apparatus 1 of the present embodiment uses an automatic cutting machine 200 as a target apparatus for abnormality diagnosis.

The automatic cutting machine 200 includes a drill 201 and a chuck portion 202. The drill 201 is a cutting tool to be used for cutting work. The chuck portion 202 is a holding apparatus which holds a workpiece 203 which is to be processed. The automatic cutting machine 200 sequentially processes a plurality of workpieces 203 by repeating a processing state and a resting state. During processing, heat is generated at a portion where the drill 201 contacts with the workpiece 203. Therefore, a heat current flows from the portion where the drill 201 contacts with the workpiece 203 to the chuck portion 202. The heat current flows from the chuck portion 202 to outside.

The abnormality diagnosis apparatus 1 includes a sensor unit 2, a control apparatus 3 and a display apparatus 4.

The sensor unit 2 detects a heat flux directed from the chuck portion 202 to outside. The sensor unit 2 outputs a sensor signal in accordance with the heat flux directed from the chuck portion 202 to outside to the control apparatus 3. The sensor unit 2 is attached on a surface of the chuck portion 202. A structure of the sensor unit 2 will be described in detail later.

The sensor unit 2 is connected to an input side of the control apparatus 3. The control apparatus 3 performs abnormality diagnosis control of the automatic cutting machine 200. This abnormality diagnosis control is a control for determining whether or not there is an abnormality at the automatic cutting machine 200 on the basis of a detection result of the sensor unit 2. Therefore, the control apparatus 3 constitutes a determining unit which determines whether or not there is an abnormality at the target apparatus on the basis of a detection result of the heat flux sensor 10. An abnormality of the automatic cutting machine 200 is a breakage of the drill 201, for example.

A display apparatus 4 is connected to an output side of the control apparatus 3. The control apparatus 3 causes the display apparatus 4 to display that there is an abnormality when there is an abnormality. The control apparatus 3 is configured to include a microcomputer, a storage apparatus, or the like.

The display apparatus 4 is an informing apparatus for informing a user that there is an abnormality. As the display apparatus 4, a liquid crystal display, or the like, are used.

Figure 2:
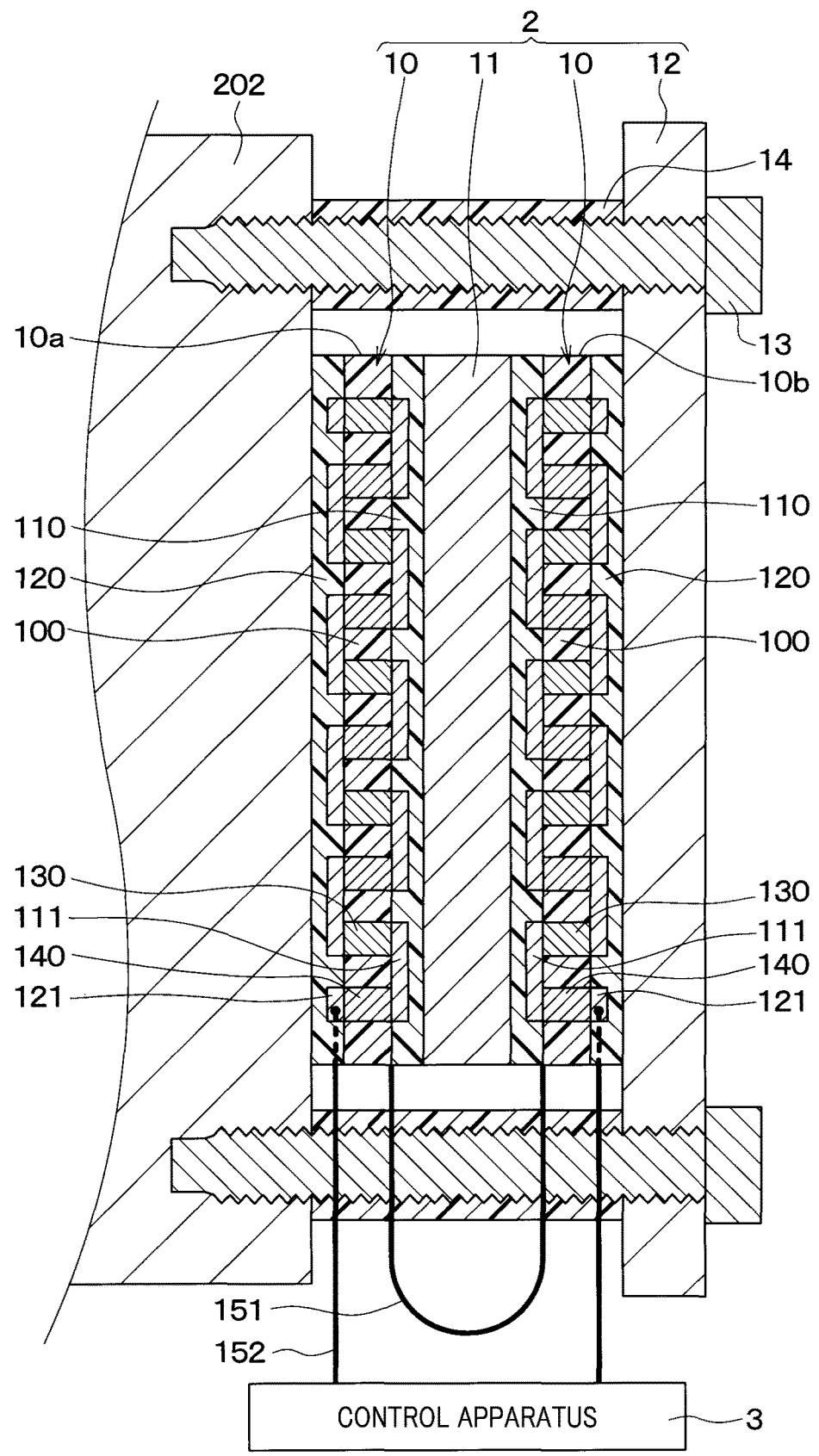
FIG. 2 is a cross-sectional view of a sensor unit illustrated in FIG. 1.

A structure of the sensor unit 2 will be described next. As illustrated in FIG. 2, the sensor unit 2 includes two heat flux sensors 10, a thermal buffer 11 and a heat sink 12. The two heat flux sensors 10, the thermal buffer 11 and the heat sink 12 are all formed in a flat plate shape.

Internal structures of the two heat flux sensors 10 are the same. One of the two heat flux sensors 10 is a first heat flux sensor 10a. Another one of the two heat flux sensors 10 is a second heat flux sensor 10b.

The first heat flux sensor 10a is disposed in contact with an outer surface of the chuck portion 202. The second heat flux sensor 10b is disposed on a side farther from the chuck portion 202 than the first heat flux sensor 10a. The thermal buffer 11 is disposed between the first heat flux sensor 10a and the second heat flux sensor 10b. The heat sink 12 is disposed on a side farther from the chuck portion 202 than the second heat flux sensor 10b. That is, in the sensor unit 2, the first heat flux sensor 10a, the thermal buffer 11, the second heat flux sensor 10b and the heat sink 12 are sequentially disposed from a side closer to the chuck portion 202 to a side farther from the chuck portion 202.

The first heat flux sensor 10a outputs a first sensor signal in accordance with a heat flux which passes through the first heat flux sensor 10a from the chuck portion 202 side to the thermal buffer 11 side of the first heat flux sensor 10a. The second heat flux sensor 10b outputs a second sensor signal in accordance with a heat flux which passes through the second heat flux sensor 10b from the thermal buffer 11 side to a side opposite to the thermal buffer 11 side of the second heat flux sensor 10b. The first heat flux sensor 10a and the second heat flux sensor 10b have rectangular shapes of the same shape and the same size.

The thermal buffer 11 has predetermined heat capacity. The thermal buffer 11 is formed of a metal material or a resin material. A material and a thickness of the thermal buffer 11 are set so as to achieve a heat capacity which enables change of the heat flux emitted from the chuck portion 202 toward outside to be detected as will be described later. A shape and a size of the planar shape of the thermal buffer 11 are the same as the shape and the size of the planar shape of the first heat flux sensor 10a. Note that the shape and the size of the planar shape of the thermal buffer 11 may be different from the shape and the size of the planar shape of the first heat flux sensor 10a.

The heat sink 12 has predetermined heat capacity. The heat sink 12 is formed of a metal material or a resin material. A material and a thickness of the heat sink 12 are set so that the heat capacity becomes larger than the heat capacity of the thermal buffer 11. A planar shape of the heat sink 12 is larger than the planar shapes of the first heat flux sensor 10a, the thermal buffer 11 and the second heat flux sensor 10b. The heat sink 12 is fixed at the chuck portion 202 with the first heat flux sensor 10a, the thermal buffer 11 and the second heat flux sensor 10b being sandwiched between the heat sink 12 and the chuck portion 202. Specifically, screw holes are formed at an outer peripheral portion of the heat sink 12. The heat sink 12 is fixed at the chuck portion 202 with screws 13 inserted into the screw holes. Note that spacers 14 are disposed between the chuck portion 202 and the heat sink 12. The screw 13 penetrates inside the spacer 14.

Figure 3:
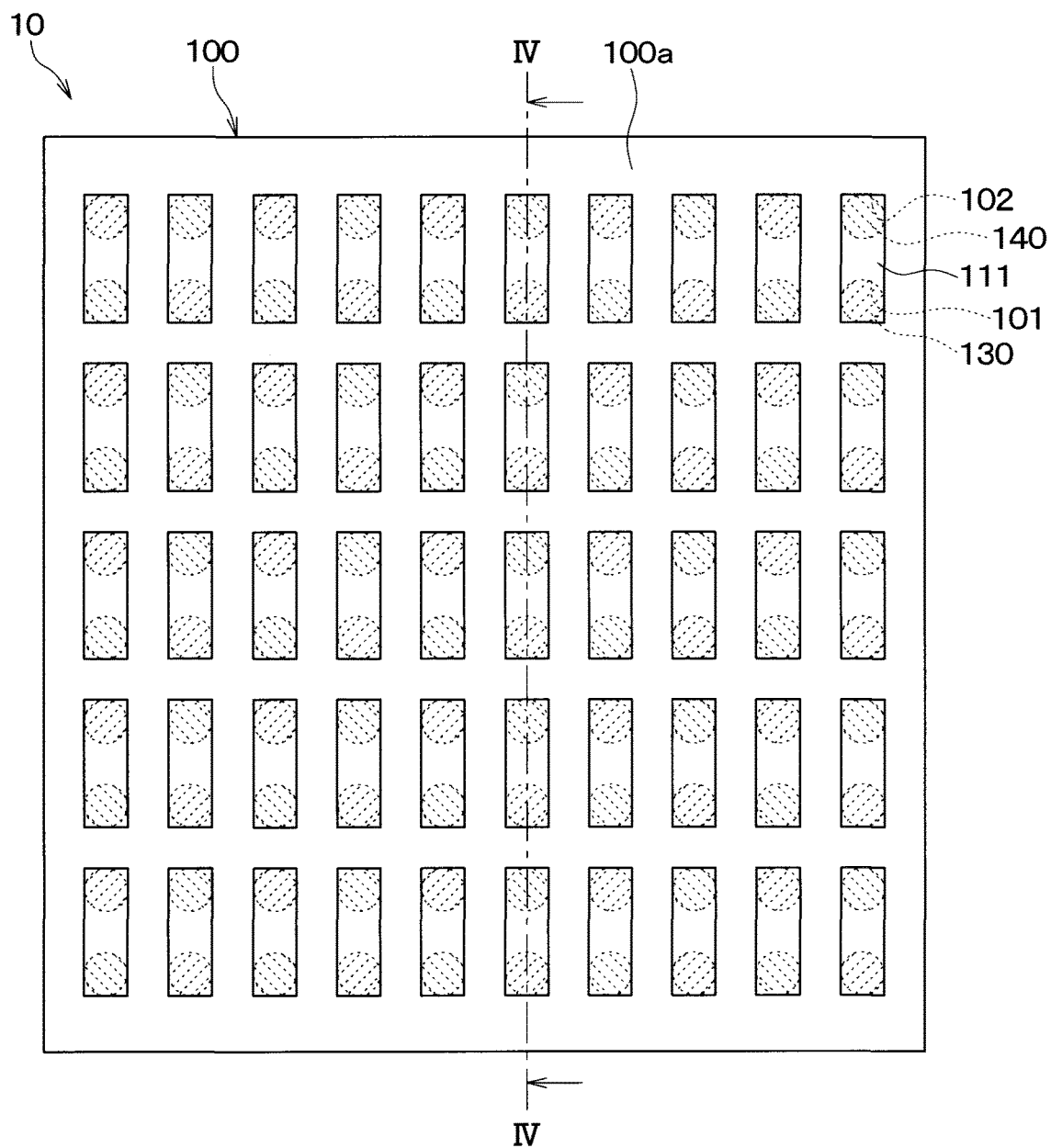
FIG. 3 is a plan view of a heat flux sensor illustrated in FIG. 2.
Figure 4:
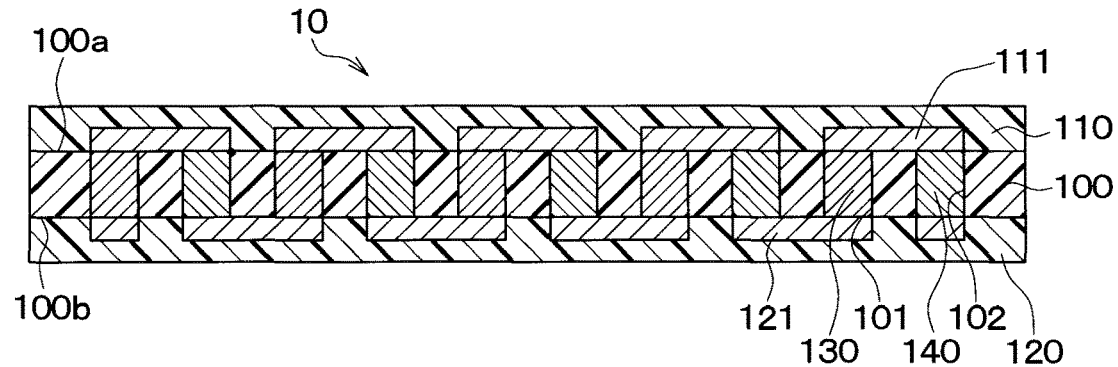
FIG. 4 is a cross-sectional view of the heat flux sensor taken along a line IV-IV illustrated in FIG. 3.

As illustrated in FIG. 3 and FIG. 4, one heat flux sensor 10 has a structure in which an insulating substrate 100, a surface protective member 110 and a back surface protective member 120 are integrated, inside of which first and second thermoelectric members 130 and 140 are alternately connected in series. Note that, in FIG. 3, the surface protective member 110 is omitted. The insulating substrate 100, the surface protective member 110 and the back surface protective member 120 have a film shape and are formed of a resin material such as a thermoplastic resin having flexibility. On the insulating substrate 100, a plurality of first and second via holes 101 and 102 which penetrate in the thickness direction thereof are formed. The first and second thermoelectric members 130 and 140 formed with thermoelectric materials such as a metal and a semiconductor, which are different from each other, are embedded into the first and the second via holes 101 and 102. A connection portion of one of the first and the second thermoelectric members 130 and 140 is formed by a surface conductive pattern 111 disposed on a surface 100a of the insulating substrate 100. A connection portion of another one of the first and the second thermoelectric members 130 and 140 is formed by a back surface conductive pattern 121 disposed on a back surface 100b of the insulating substrate 100.

When the heat flux passes through the heat flux sensor 10 in a thickness direction of the heat flux sensor 10, a temperature difference occurs between the connection portion of one of the first and the second thermoelectric members 130 and 140 and the connection portion of the other. By this means, thermoelectric force occurs at the first and the second thermoelectric members 130 and 140 by the Seebeck effect. The heat flux sensor 10 outputs this thermoelectric force, specifically, a voltage as the sensor signal.

In the present embodiment, the first heat flux sensor 10a and the second heat flux sensor 10b are configured to output sensor signals of which absolute values are the same when the heat fluxes passing through the first heat flux sensor 10a and the second heat flux sensor 10b have the same magnitude.

Further, as illustrated in FIG. 2, the first heat flux sensor 10a and the second heat flux sensor 10b are electrically connected to the control apparatus 3 in a state where the first heat flux sensor 10a and the second heat flux sensor 10b are connected to each other in series. The first heat flux sensor 10a and the second heat flux sensor 10b are arranged so as to output the first sensor signal and the second sensor signal of which polarities are inverse when the heat flux from the chuck portion 202 sequentially passes through the first heat flux sensor 10a and the second heat flux sensor 10b.

Specifically, the first and the second heat flux sensors 10a and 10b are arranged so that the surface protective members 110 of the first and the second heat flux sensors 10a and 10b face each other. Further, although not illustrated, the surface conductive patterns 111 of the first and the second heat flux sensors 10a and 10b are connected to each other via an external wiring 151. Each of the back surface conductive patterns 121 of the first and the second heat flux sensors 10a and 10b is connected to the control apparatus 3 via an external wiring 152. By this means, in a case where a heat flux passes through the first heat flux sensor 10a from the back surface protective member 120 side to the surface protective member 110 side, because the heat flux passes through the second heat flux sensor 10b from the surface protective member 110 side to the back surface protective member 120 side, polarities of the first and the second sensor signals output from the first and the second heat flux sensors 10a and 10b become opposite with respect to each other.

Note that, in the present embodiment, the first and the second heat flux sensors 10a and 10b output positive sensor signals when a heat flux passes from the back surface protective member 120 side to the surface protective member 110 side. Therefore, if a heat flux flows from the chuck portion 202 side toward the heat sink 12 side, a positive sensor signal is outputted from the first heat flux sensor 10a, and a negative sensor signal is outputted from the second heat flux sensor 10b.

Then, the sensor unit 2 outputs a sensor signal in which the first sensor signal and the second sensor signal are combined to the control apparatus 3. At this time, if a difference between heat fluxes which pass through the first and the second heat flux sensors 10a and 10b is large, the sensor signal output from the sensor unit 2 becomes large. For example, a case where a heat flux emitted from a target rapidly increases corresponds to such a case. Meanwhile, if a difference between the heat fluxes which pass through the first and the second heat flux sensors 10a and 10b is small, output from the sensor unit 2 becomes small. For example, a case where a heat flux emitted from the target decreases or a case where predetermined time has elapsed while a constant heat flux is emitted from the target corresponds to such a case.

Abnormality diagnosis control to be performed by the control apparatus 3 will be described next.

First, a heat flux which passes through the sensor unit 2 and a sensor signal outputted from the sensor unit 2 will be described.

When processing of one workpiece 203 is finished, the automatic cutting machine 200 stands by in a resting state until preparation for processing of the next workpiece 203 is completed. The automatic cutting machine 200 starts processing the next workpiece 203 when preparation for processing of the next workpiece 203 is completed. In this manner, the automatic cutting machine 200 repeats an operating cycle including a processing state and a resting state in one cycle.

Figure 5:
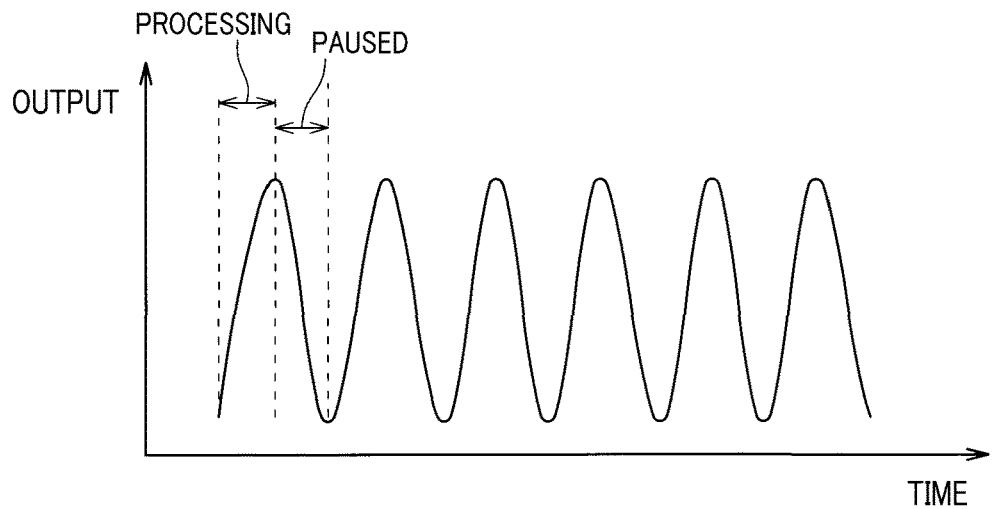
FIG. 5 is a diagram illustrating an output waveform of the sensor unit when a drill bit is in a normal state.

When a bit of the drill 201 is in a normal state, an output value of the sensor unit 2 increases during processing, and the output value of the sensor unit 2 decreases while the automatic cutting machine 200 stands by until the next processing. Therefore, as illustrated in FIG. 5, a waveform indicating change of the output value of the sensor unit 2 over time becomes a waveform which regularly increases/decreases along the operating cycle of the automatic cutting machine 200.

The reason is as described below. During processing, a heat flux which flows through the chuck portion 202 increases. The heat flux which flows through the chuck portion 202 decreases when the processing is finished. At this time, as illustrated in FIG. 2, the first heat flux sensor 10a has nothing for blocking the heat flux from the chuck portion 202. Therefore, the heat flux which passes through the first heat flux sensor 10a increases/decreases in a similar manner to the heat flux which flows through the chuck portion 202. Meanwhile, as illustrated in FIG. 2, in the second heat flux sensor 10b, the thermal buffer 11 is disposed on the first heat flux sensor 10a side. The thermal buffer 11 performs heat accumulation and heat transfer. Therefore, the heat flux does not pass through the second heat flux sensor 10b. Alternatively, a heat flux which passes through the second heat flux sensor 10b moderately increases/decreases later than increase/decrease of the heat flux which passes through the first heat flux sensor 10a. The sensor signal output from the sensor unit 2 toward the control apparatus 3 is a combined signal of the first sensor signal and the second sensor signal. Therefore, the output value of the sensor unit 2 regularly increases/decreases along the operating cycle of the automatic cutting machine 200.

Figure 6:
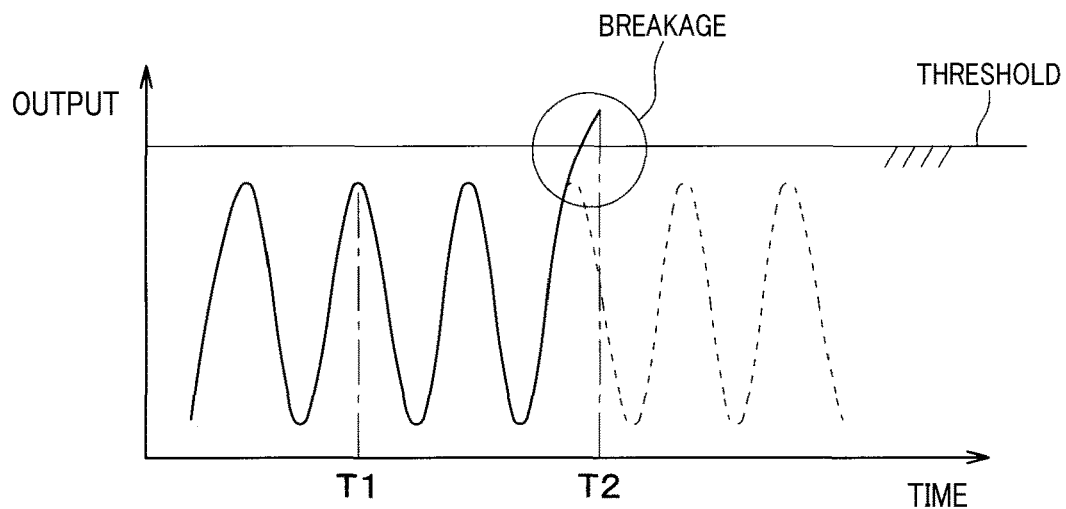
FIG. 6 is a diagram illustrating an output waveform of the sensor unit when the drill bit breaks.

On the other hand, when a sudden abnormality, for example, breakage occurs at the bit of the drill 201 during processing, abnormal heat generation occurs by the workpiece 203 being rubbed against the drill 201. Therefore, as illustrated in FIG. 6, when a sudden abnormality occurs at the bit of the drill 201, the output value rises and becomes larger than that in a normal state. Accordingly, a threshold for distinguishing between a normal state and a state where a sudden abnormality occurs is set in advance, and the output value of the sensor unit 2 is compared with the threshold. By this means, it is possible to determine whether or not there is a sudden abnormality.

Figure 7:
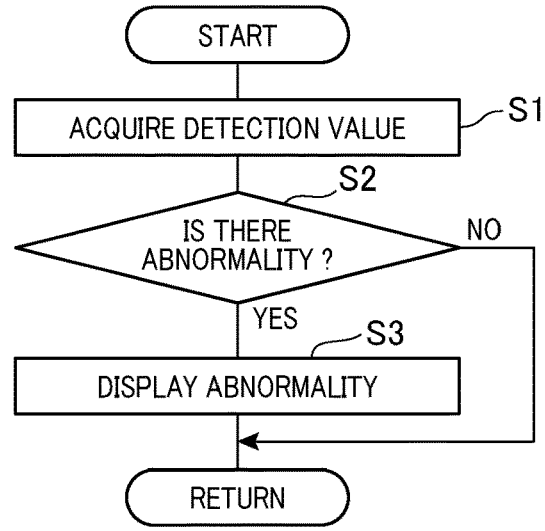
FIG. 7 is a flowchart illustrating abnormality diagnosis control in the first embodiment.

Therefore, as illustrated in FIG. 7, the control apparatus 3 makes a diagnosis regarding an abnormality on the basis of the detection result of the sensor unit 2. Note that respective steps illustrated in FIG. 7 constitute a function implementing unit which implements various kinds of functions.

Specifically, the control apparatus 3 acquires the detection value of the sensor unit 2 in step S1. Here, the control apparatus 3 acquires an output value (specifically, a voltage value) of the sensor unit 2 at predetermined time. Note that it is also possible to acquire a correction value obtained by correcting the output value as the detection value instead of using the output value of the sensor unit 2 as is.

Subsequently, the control apparatus 3 determines whether or not there is an abnormality by comparing the detection value with the threshold in step S2. Here, in a case where the detection value does not exceed the threshold, asat time T1 illustrated in FIG. 6, it is determined that there is no abnormality. In the case where it is determined that there is no abnormality, the control apparatus 3 performs step S1 again. Meanwhile, in a case where the detection value exceeds the threshold, as at time T2 illustrated in FIG. 6, the control apparatus 3 determines that there is an abnormality.

In the case where it is determined that there is an abnormality, the control apparatus 3 outputs a control signal for causing the display apparatus 4 to display that there is an abnormality in step S3. By this means, a maintenance worker is informed of the abnormality. As a result, the maintenance worker can take necessary measures, that is, can replace the drill 201.

As described above, the abnormality diagnosis apparatus 1 of the present embodiment includes the sensor unit 2 which detects a heat flux flowing from the chuck portion 202 toward outside, and the control apparatus 3 which determines an abnormality of the drill 201. The heat flux flowing from the chuck portion 202 is generated by heat generation at a portion where the drill 201 contacts with the workpiece 203. In the sensor unit 2, the thermal buffer 11 is disposed between the first heat flux sensor 10a and the second heat flux sensor 10b. The thermal buffer 11 performs heat accumulation and heat transfer. Therefore, when the heat flux emitted from the chuck portion 202 changes, the heat flux which passes through the second heat flux sensor 10b moderately changes later than change of the heat flux which passes through the first heat flux sensor 10a. Therefore, it is possible to detect change of the heat flux emitted from the chuck portion 202 from a difference between the first sensor signal and the second sensor signal.

It should be noted that it is also possible to detect the heat flux emitted from the chuck portion 202 using only one heat flux sensor 10 instead of using the sensor unit 2 of the present embodiment.

However, in this case, if the environmental temperature around the chuck portion 202 changes, the heat flux which passes through the heat flux sensor 10 also changes by being affected by the environmental temperature. That is, even if an amount of heat generation at the portion where the drill 201 contacts with the workpiece 203 does not change, the heat flux which passes through the heat flux sensor 10 increases if the environmental temperature decreases.

Figure 8:
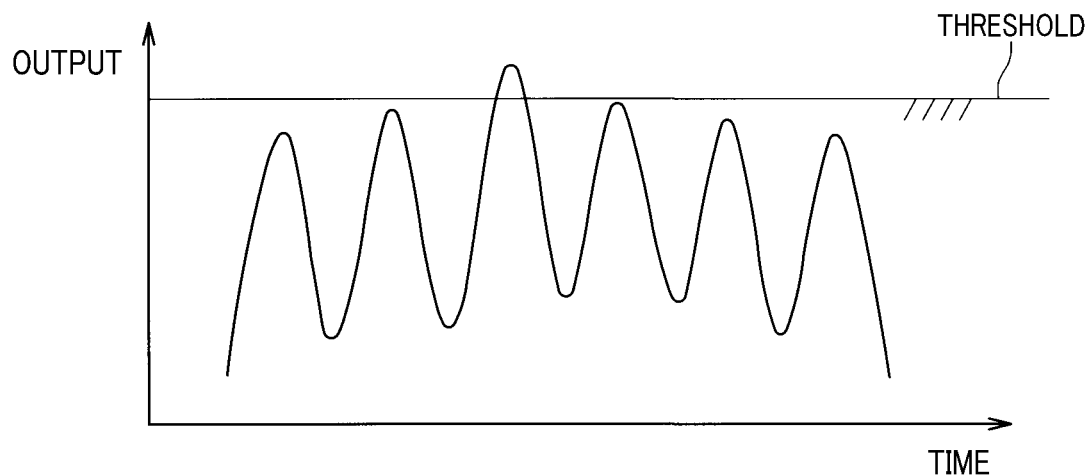
FIG. 8 is a diagram illustrating an output waveform of a heat flux sensor when a drill bit is in a normal state and when the heat flux sensor is affected by an environmental temperature in a comparative example in which one heat flux sensor is used.

Therefore, as illustrated in FIG. 8, there is a case where, even if the bit of the drill 201 is in a normal state, the output value of the sensor unit 2 exceeds the threshold by fluctuation of the environmental temperature of one day. In this case, the control apparatus 3 erroneously determines a state of the bit of the drill 201 as abnormal. Further, to avoid this erroneous determination, there is a possible way in which the threshold is set higher in view of fluctuation of the environmental temperature. However, in this case, even if the bit of the drill 201 is broken, it is erroneously determined that the state is normal. That is, sensitivity of detection of an abnormality of the drill 201 is lowered.

In contrast to this, the first heat flux sensor 10a and the second heat flux sensor 10b of the sensor unit 2 of the present embodiment are disposed on the both sides of the thermal buffer 11. Therefore, the both are disposed at positions relatively close to each other. Further, the environmental temperature around the sensor unit 2 normally changes moderately over a long period of time of one day. Therefore, even if the thermal buffer 11 is disposed between the first heat flux sensor 10a and the second heat flux sensor 10b, the first heat flux sensor 10a and the second heat flux sensor 10b are affected by the environmental temperature in the same way or in almost the same way. The first heat flux sensor 10a and the second heat flux sensor 10b respectively output sensor signals in accordance with the heat fluxes affected by the same environmental temperature. At the first heat flux sensor 10a and the second heat flux sensor 10b, absolute values of outputs with respect to the same magnitude of heat fluxes are the same. Therefore, it is possible to eliminate (that is, cancel) influence of the environmental temperature on the detection result of the sensor unit 2 by using a sum of an output of the first heat flux sensor 10a and an output of the second heat flux sensor 10b.

Therefore, an output waveform of the sensor unit 2 when the bit of the drill 201 is in a normal state becomes a waveform in which influence of the environmental temperature is eliminated as illustrated in FIG. 5. By this means, it is possible to avoid erroneous determination by the fluctuation of the environmental temperature of one day. Further, it becomes unnecessary to set the threshold higher in view of the fluctuation of the environmental temperature.

Therefore, according to the abnormality diagnosis apparatus 1 of the present embodiment, it is possible to make a diagnosis regarding an abnormality of the automatic cutting machine 200 with high accuracy. Note that, at the first heat flux sensor 10a and the second heat flux sensor 10b, absolute values of outputs with respect to the same magnitude of the heat fluxes does not have to be always the same. It is only necessary that absolute values of the both outputs are close to each other. Also in this case, it is possible to reduce influence of the environmental temperature on the detection result of the sensor unit 2 by using a sum of the outputs of the first heat flux sensor 10a and the second heat flux sensor 10b.

Further, in the sensor unit 2 of the present embodiment, the first heat flux sensor 10a and the second heat flux sensor 10b output the first sensor signal and the second sensor signal of which polarities are opposite with respect to each other when the heat flux from the chuck portion 202 sequentially passes through the first heat flux sensor 10a and the second heat flux sensor 10b. The first heat flux sensor 10a and the second heat flux sensor 10b are electrically connected to the control apparatus 3 in a state where the first heat flux sensor 10a and the second heat flux sensor 10b are connected to each other in series. By this means, it is possible to output a sensor signal which is a combined signal of the first sensor signal and the second sensor signal to the control apparatus 3 from the sensor unit 2. Therefore, it is possible to omit calculation of a sum of the first sensor signal and the second sensor signal at the control apparatus 3. That is, it is possible to simplify calculation processing at the control apparatus 3.

It should be noted that the sensor unit 2 may employ a configuration not including the heat sink 12. However, in a case where the sensor unit 2 does not include the heat sink 12, a surface temperature of the second heat flux sensor 10b instantaneously changes due to wind blowing against the surface of the second heat flux sensor 10b, or the like. This affects the heat flux which passes through the sensor unit 2. Therefore, detection accuracy of the heat flux of the sensor unit 2 degrades.

In contrast to this, the sensor unit 2 of the present embodiment includes the heat sink 12 having predetermined heat capacity. By this means, even in the case where the surface temperature of the sensor unit 2 changes in a short period of time, it is possible to suppress temperature change of the second heat flux sensor 10b from occurring by heat accumulation and heat transfer at the heat sink 12. Therefore, it is possible to improve detection accuracy of the heat flux of the sensor unit 2.

Further, at the sensor unit 2 of the present embodiment, the heat capacity of the heat sink 12 is larger than the heat capacity of the thermal buffer 11. By this means, even when a large amount of heat is emitted from the chuck portion 202, it is possible to make heat flow from the chuck portion 202 toward the heat sink 12. Therefore, it is possible to prevent heat from being confined inside the sensor unit 2.

Second Embodiment

Figure 9:
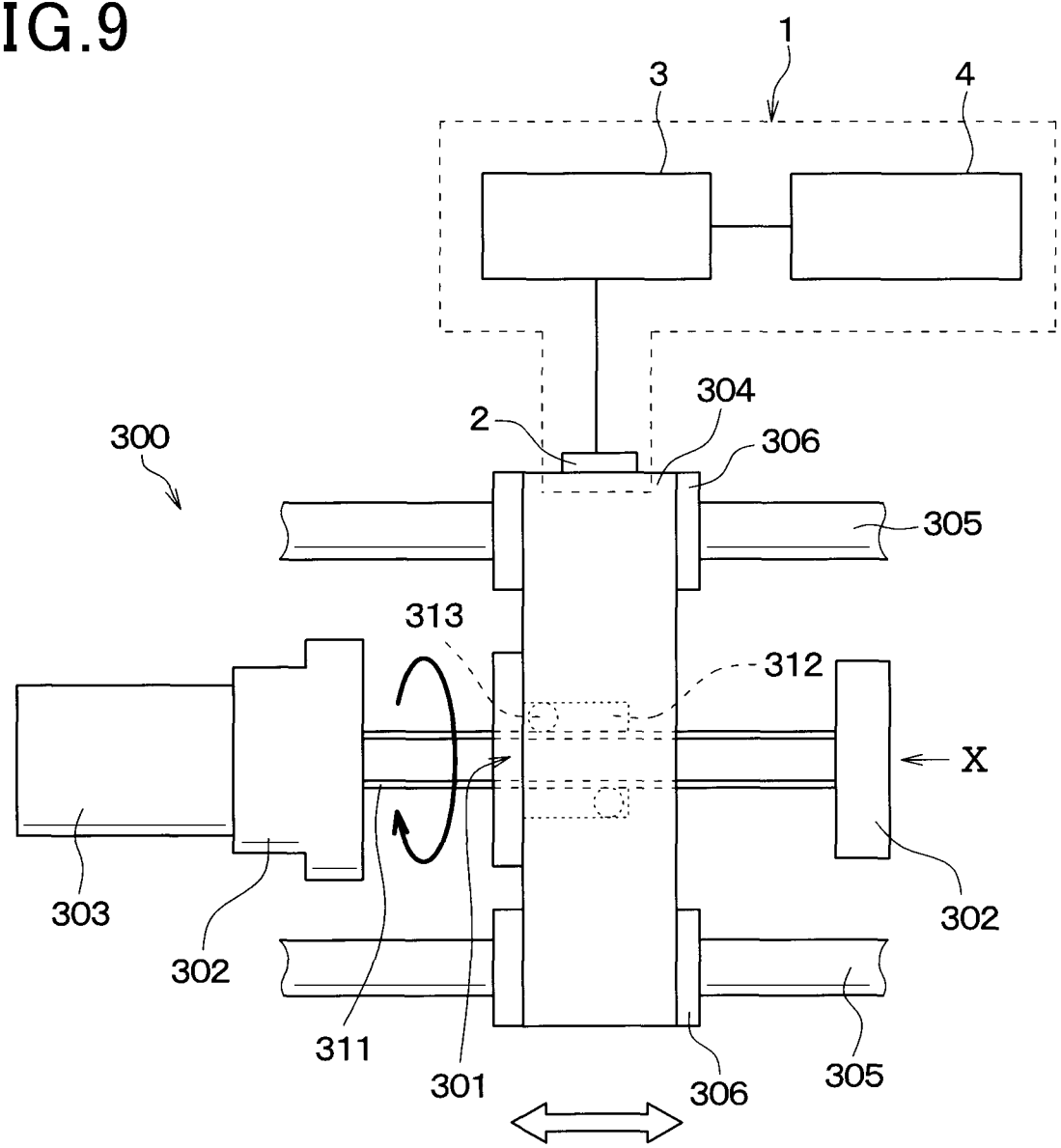
FIG. 9 is a diagram illustrating configurations of a workpiece feeding apparatus and an abnormality diagnosis apparatus in a second embodiment.

As illustrated in FIG. 9, an abnormality diagnosis apparatus 1 of the present disclosure uses a workpiece feeding apparatus 300 as a target apparatus for abnormality diagnosis.

Figure 10:
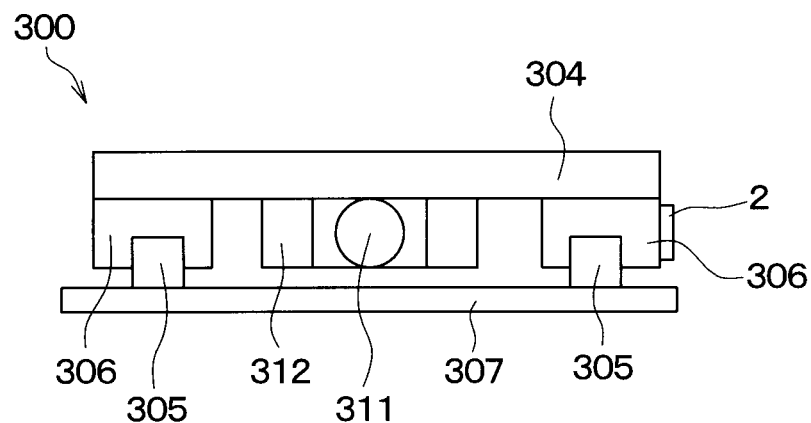
FIG. 10 is a detail diagram viewed in a direction of an arrow X of the workpiece feeding apparatus illustrated in FIG. 9.

As illustrated in FIG. 9 and FIG. 10, the workpiece feeding apparatus 300 includes a ball screw 301, a supporting member 302, a motor 303, a seat 304, rails 305 and guide blocks 306. Note that, in FIG. 10, the supporting member 302 is omitted to facilitate understanding.

The ball screw 301 is a mechanical element part which converts rotation movement into linear movement. The ball screw 301 includes a screw shaft 311, a nut 312 and balls 313. The balls 313 are inserted between the screw shaft 311 and the nut 312. If the screw shaft 311 rotates, the nut 312 linearly moves. The supporting member 302 supports both end portions of the screw shaft 311 in a shaft direction. The motor 303 is a power source which rotates the screw shaft 311.

The seat 304 is provided so that an apparatus which is desired to be transferred, or the like, is mounted. The seat 304 is made a planar rectangular shape in which a direction orthogonal to the shaft direction of the screw shaft 311 (that is, a vertical direction in FIG. 9) is made a longitudinal direction. An approximately center portion of the seat 304 in the longitudinal direction is connected to the nut 312. Both end portions of the seat 304 in the longitudinal direction are connected to the guide blocks 306. The rails 305 are linear members. Two rails 305 are used, and, as illustrated in FIG. 10, the rails 305 are fixed at a base plate 307. The guide blocks 306 are engaged with the rails 305. The guide blocks 306 are guide members which move along the rails 305. The guide blocks 306 slide with respect to the rails 305.

In such a workpiece feeding apparatus 300, if the screw shaft 311 rotates by the motor 303, the seat 304 travels along the rails 305 along with the nut 312. By this means, it is possible to transfer the seat 304 at a desired position.

A configuration of the abnormality diagnosis apparatus 1 of the present embodiment is the same as that of the abnormality diagnosis apparatus 1 of the first embodiment. The sensor unit 2 is attached on a surface of the guide block 306 of the workpiece feeding apparatus 300. While illustration is omitted, in the sensor unit 2, the first heat flux sensor 10a, the thermal buffer 11, the second heat flux sensor 10b and the heat sink 12 are sequentially disposed from a side closer to the guide block 306 toward a side farther from the guide block 306.

Abnormality diagnosis control of the present embodiment will be described next.

First, a sensor signal outputted from the sensor unit 2 will be described. The workpiece feeding apparatus 300 repeats an operating cycle including a traveling state and a resting state of the seat 304 as one cycle. While the seat 304 is traveling, the output value of the sensor unit 2 increases by friction of a sliding portion of the guide block 306. While the seat 304 is in a resting state, the output value of the sensor unit 2 decreases.

Figure 11:
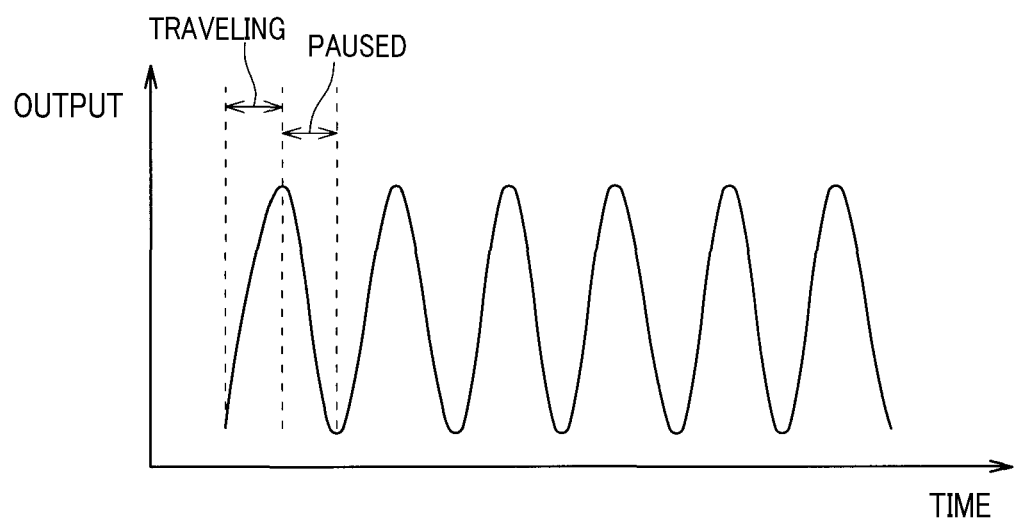
FIG. 11 is a diagram illustrating an output waveform of a sensor unit 2 when a sliding portion of a guide block is in a normal state.

Therefore, as illustrated in FIG. 11, when the sliding portion of the guide block 306 is in a normal state, a waveform indicating change of the output value of the sensor unit 2 over time becomes a waveform which regularly increases and decreases along the operating cycle of the workpiece feeding apparatus 300.

Figure 12:
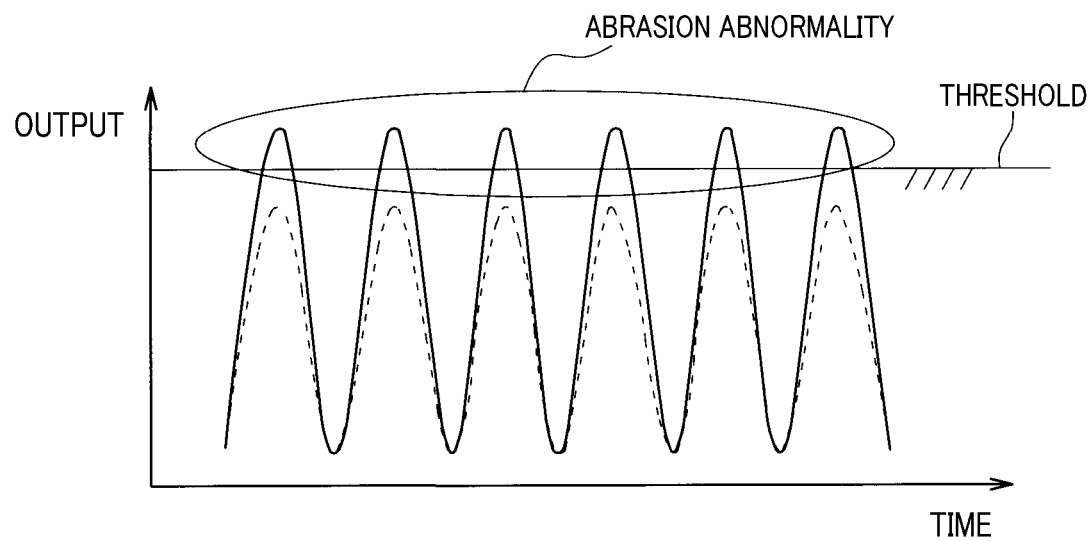
FIG. 12 is a diagram illustrating an output waveform of the sensor unit 2 when the sliding portion of the guide block is in an abnormal state due to abrasion.

Meanwhile, as abrasion of the sliding portion of the guide block 306 progresses, sliding resistance of the sliding portion increases. Therefore, an amount of heat generated due to friction of the sliding portion while the seat 304 is travelling gradually increases. As a result, when an abnormality over time due to abrasion, that is, an abrasion abnormality occurs at the guide block 306, as illustrated in FIG. 12, the output value rises and becomes larger than that in a normal state. Therefore, it is possible to determine whether or not there is an abnormality over time by setting a threshold for discerning between a normal state and a state where an abnormality over time occurs in advance and comparing the output value of the sensor unit 2 with the threshold.

Therefore, also in the present embodiment, in a similar manner to the first embodiment, the control apparatus 3 makes a diagnosis regarding an abnormality on the basis of the detection result of the sensor unit 2. Specifically, the control apparatus 3 compares the detection value of the sensor unit 2 with the threshold. As indicated with an undulating line in FIG. 12, in a case where the detection value does not exceed the threshold, the control apparatus 3 determines that there is no abnormality. Meanwhile, as indicated with a solid line in FIG. 12, in a case where the detection value exceeds the threshold, the control apparatus 3 determines that there is an abnormality. In this manner, according to the abnormality diagnosis apparatus 1 of the present embodiment, it is possible to make a diagnosis regarding whether or not there is an abnormality over time at the workpiece feeding apparatus 300.

Incidentally, it is also possible to detect a heat flux emitted from the guide block 306 using only one heat flux sensor 10 instead of using the sensor unit 2 of the present embodiment.

However, in this case, as with the explanation in the first embodiment, if an environmental temperature around the guide block 306 changes, the heat flux which passes through the heat flux sensor 10 also changes by being affected by the environmental temperature. That is, even if an amount of heat generation at the sliding portion of the guide block 306 does not change, the heat flux which passes through the heat flux sensor 10 increases if the environmental temperature decreases.

Figure 13:
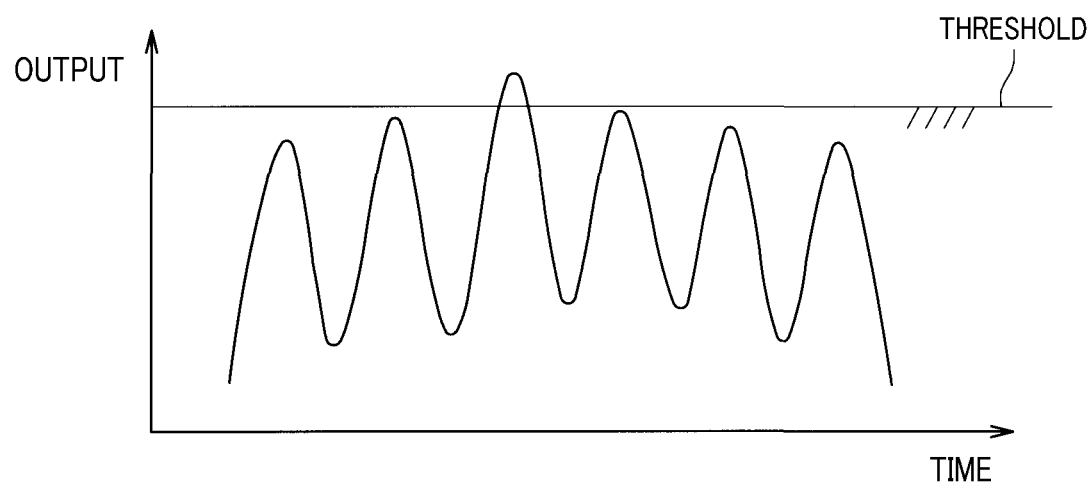
FIG. 13 is a diagram illustrating an output waveform of a heat flux sensor when the sliding portion of the guide block is in a normal state and when the heat flux sensor is affected by an environment temperature in a comparative example in which one heat flux sensor is used.

Therefore, as illustrated in FIG. 13, there is a case where the output value of the sensor unit 2 exceeds the threshold by fluctuation of the environmental temperature of one day even if the guide block 306 is in a normal state. In this case, the control apparatus 3 erroneously determines a state of the guide block 306 as abnormal. Further, to avoid this erroneous determination, it is also possible to set the threshold higher in view of the fluctuation of the environmental temperature. However, in this case, even if the state of the guide block 306 is abnormal, it is erroneously determined that the state of the guide block 306 is normal. That is, sensitivity of detection of an abnormality at the guide block 306 is lowered.

In contrast to this, according to the sensor unit 2 of the present embodiment, it is possible to eliminate influence of the environmental temperature on the detection result of the sensor unit 2 by using a sum of output of the first heat flux sensor 10a and output of the second heat flux sensor 10b.

Therefore, an output waveform of the sensor unit 2 when the sliding portion of the guide block 306 is in a normal state becomes a waveform in which influence of the environmental temperature is eliminated as illustrated in FIG. 10. By this means, it is possible to avoid erroneous determination by the fluctuation of the environmental temperature of one day. Further, it is unnecessary to set the threshold higher in view of the fluctuation of the environmental temperature.

Therefore, according to the abnormality diagnosis apparatus 1 of the present embodiment, it is possible to make a diagnosis regarding an abnormality of the workpiece feeding apparatus 300 with high accuracy.

Third Embodiment

The present embodiment is an embodiment in which the configuration of the sensor unit 2 is changed from that in the first embodiment. The other configuration of the abnormality diagnosis apparatus 1 is the same as that of the first embodiment.

Figure 14:
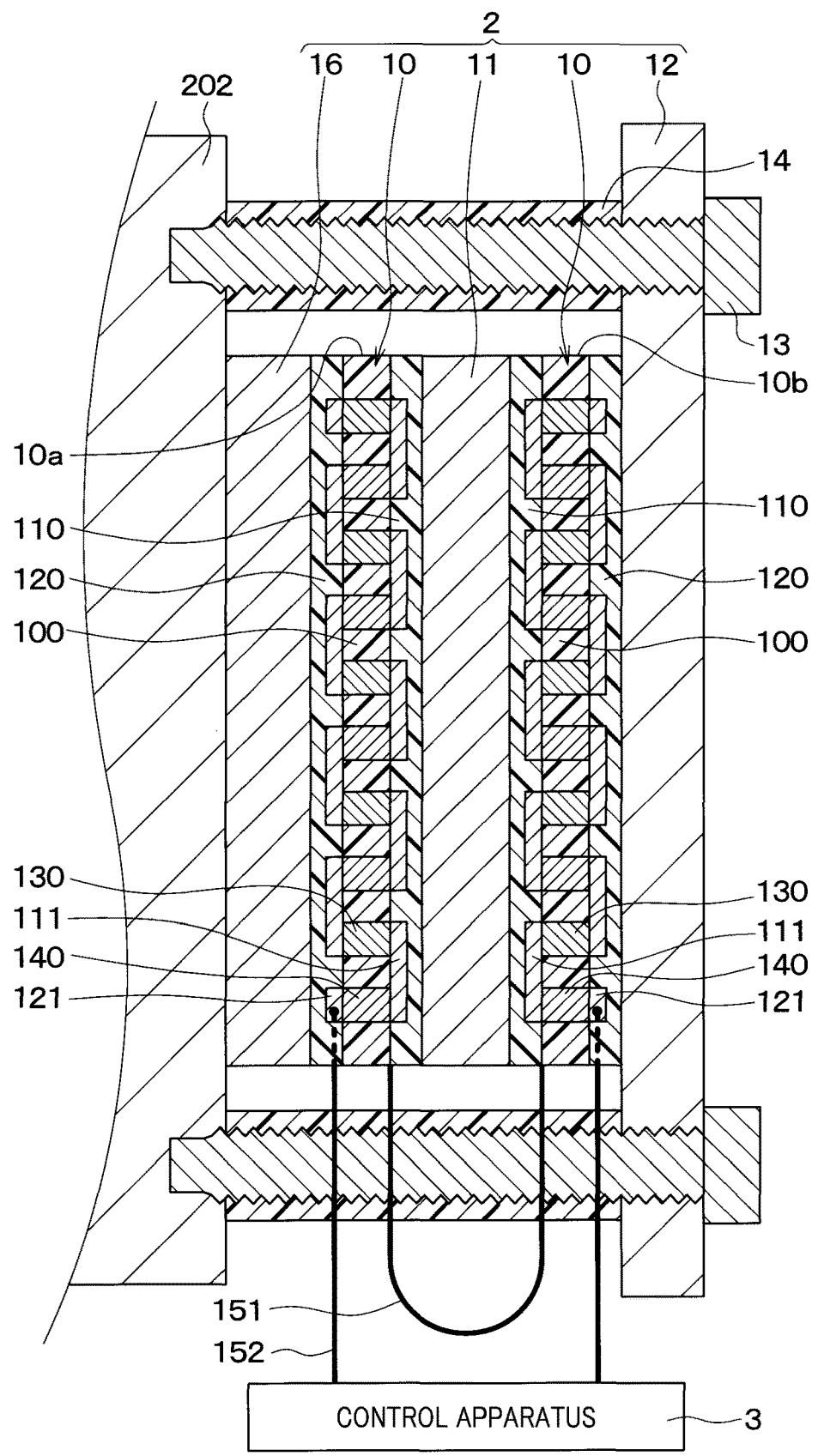
FIG. 14 is a cross-sectional view of a sensor unit in a third embodiment.

As illustrated in FIG. 14, the sensor unit 2 of the present embodiment includes a flat plate heat receiver 16. The heat receiver 16 is disposed closer to the chuck portion 202 than the first heat flux sensor 10a. That is, the heat receiver 16 is disposed between the chuck portion 202 and the first heat flux sensor 10a.

The heat receiver 16 has predetermined heat capacity in a similar manner to the thermal buffer 11 and the heat sink 12. The heat receiver 16 is formed of a metal material or a resin material. A material and a thickness of the heat receiver 16 are set so that the heat capacity becomes smaller than those of the thermal buffer 11 and the heat sink 12. A shape and a size of the planar shape of the heat receiver 16 are the same as the shape and the size of the planar shape of the first heat flux sensor 10a. Note that the shape and the size of the planar shape of the heat receiver 16 may be different from the shape and the size of the planar shape of the first heat flux sensor 10a.

At the sensor unit 2 of the present embodiment, it is possible to prevent change of the heat flux such as noise which is not a detection target, and which occurs in the short term from affecting the first and the second heat flux sensors 10a and 10b, by heat accumulation and heat transfer of the heat receiver 16.

Further, in the sensor unit 2 of the present embodiment, heat capacity of the heat receiver 16 is set small. Therefore, the sensor unit 2 of the present embodiment can detect change of the heat flux by operation and rest of the drill 201 which is a detection target. That is, in the sensor unit 2 of the present embodiment, the heat capacity of the heat receiver 16 is set so as to be able to detect change of the heat flux by operation and rest of the drill 201.

Therefore, the abnormality diagnosis apparatus 1 of the present embodiment can make a diagnosis regarding an abnormality of the automatic cutting machine 200 with high accuracy. Note that, also in the second embodiment, the sensor unit 2 may be configured to include the heat receiver 16. By this means, similar effects to those of the present embodiment are provided.

Fourth Embodiment

The present embodiment is an embodiment in which the configuration of the sensor unit 2 is changed from that in the first embodiment. The other configuration of the abnormality diagnosis apparatus 1 is the same as that of the first embodiment.

Figure 15:
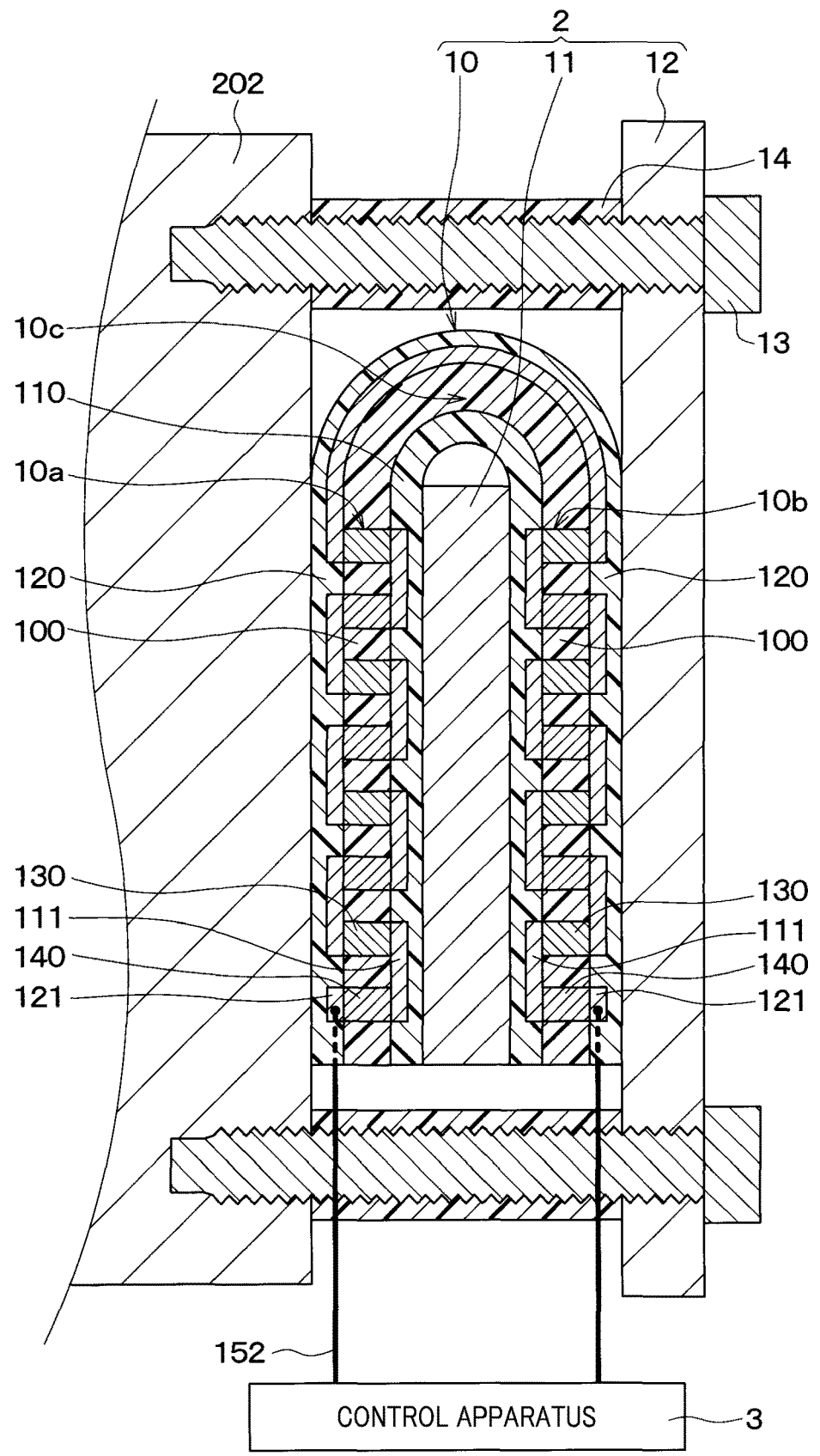
FIG. 15 is a cross-sectional view of a sensor unit in a fourth embodiment.

As illustrated in FIG. 15, in the sensor unit 2 of the present embodiment, the first and the second heat flux sensors 10a and 10b are connected via a bent-shaped portion 10c having a bent shape. The bent-shaped portion 10c has a structure in which an insulating substrate 100, a surface protective member 110 and a back surface protective member 120 are laminated in a similar manner to the first and the second heat flux sensors 10a and 10b. In this manner, in the sensor unit 2 of the present embodiment, the first and the second heat flux sensors 10a and 10b are integrated.

In other words, the sensor unit 2 of the present embodiment has a structure in which one heat flux sensor 10 is bent so as to sandwich the thermal buffer 11. As described above, each of the insulating substrate 100, the surface protective member 110 and the back surface protective member 120 in the heat flux sensor 10 is formed of a resin material having flexibility. Therefore, it is possible to easily bend the heat flux sensor 10. By this means, it is possible to realize a configuration in which the thermal buffer 11 is disposed between the first heat flux sensor 10a and the second heat flux sensor 10b.

Back surface conductive patterns 121 of the first and the second heat flux sensors 10a and 10b are connected to each other. The first heat flux sensor 10a is electrically connected to the second heat flux sensor 10b by wiring patterns inside the heat flux sensor 10 instead of by the external wiring 151. Note that the first heat flux sensor 10a may be connected to the second heat flux sensor 10b through respective surface conductive patterns 111.

According to this, the first and the second heat flux sensors 10a and 10b are configured as one heat flux sensor 10, so that it is possible to eliminate the external wiring 151 for connecting the first heat flux sensor 10a and the second heat flux sensor 10b. It is therefore possible to realize reduction in the number of parts.

Other Embodiments

The present disclosure is not limited to the above-described embodiments, and can be modified as appropriate as described below within the scope recited in the claims.
(1) Although the abnormality diagnosis apparatus 1 makes a diagnosis regarding whether or not there is a sudden abnormality such as breakage of the automatic cutting machine 200 in the first embodiment, the abnormality diagnosis apparatus 1 can make a diagnosis regarding whether or not there is a sudden abnormality occurring at a facility other than the automatic cutting machine 200 in a similar manner. A target apparatus for which the abnormality diagnosis apparatus 1 can make a diagnosis is an apparatus in which a heat flux changes as a result of an amount of heat generation increasing or decreasing in a predetermined cycle.
(2) Although the abnormality diagnosis apparatus 1 makes a diagnosis regarding whether or not there is an abrasion abnormality which is an abnormality over time of the workpiece feeding apparatus 300 in the second embodiment, the abnormality diagnosis apparatus 1 can make a diagnosis regarding whether or not there is an abnormality over time occurring at a facility other than the workpiece feeding apparatus 300 in a similar manner. A target apparatus for which the abnormality diagnosis apparatus 1 can make a diagnosis is an apparatus in which a heat flux changes as a result of an amount of heat generation increasing or decreasing in a predetermined cycle. Examples of the abnormality over time can include abrasion of the sliding portion, lack of a lubricant at the sliding portion, or the like.
(3) Although the first heat flux sensor 10a and the second heat flux sensor 10b are electrically connected to the control apparatus 3 in a state where the first heat flux sensor 10a and the second heat flux sensor 10b are connected to each other in series in the sensor unit 2 of the first to the third embodiments, the first heat flux sensor 10a and the second heat flux sensor 10b may be connected in parallel to the control apparatus 3.

Further, although the first heat flux sensor 10a and the second heat flux sensor 10b are arranged so as to output the first sensor signal and the second sensor signal of which polarities are inverse in the sensor unit 2 of the first to the third embodiments, arrangement of the first heat flux sensor 10a and the second heat flux sensor 10b is not limited thereto. The first heat flux sensor 10a and the second heat flux sensor 10b may be arranged so as to output the first sensor signal and the second sensor signal of which polarities are the same. In this case, the first heat flux sensor 10a and the second heat flux sensor 10b are connected in parallel to the control apparatus 3. Further, in abnormality diagnosis control, the control apparatus 3 calculates a difference between the first sensor signal and the second sensor signal. By this means, it is possible to perform abnormality diagnosis control in a similar manner to the first and the second embodiments.
(4) In the sensor unit 2 of the first to the third embodiments, the insulating substrate 100, the surface protective member 110 and the back surface protective member 120 of the heat flux sensor 10 may be formed of a n insulating material having flexibility other than the resin material. Further, the insulating substrate 100, the surface protective member 110 and the back surface protective member 120 may be formed of a n insulating material which does not have flexibility. Still further, the heat flux sensor 10 may have a structure which does not include the surface protective member 110 and the back surface protective member 120. Further, the heat flux sensor 10 may employ a configuration different from the above-described configuration.
(5) In the sensor unit 2 of the fourth embodiment, the insulating substrate 100, the surface protective member 110 and the back surface protective member 120 of the heat flux sensor 10 may be formed of a n insulating material having flexibility other than the resin material. Further, the heat flux sensor 10 may have a structure which does not include the surface protective member 110 and the back surface protective member 120. In this case, the first heat flux sensor 10a is connected to the second heat flux sensor 10b via the bent-shaped portion 10c configured with the insulating substrate 100. In short, it is only necessary that the bent-shaped portion 10c be configured to include an insulating material which is the same as a material of the insulating substrate 100.
(6) Although the sensor unit 2 of the above-described each embodiment includes two heat flux sensors 10, the thermal buffer 11 and the heat sink 12, the sensor unit 2 does not have to include the heat sink 12. In this case, the sensor unit 2 is fixed using a fixing material or an adhesive.
(7) Although a voltage is used as the sensor signal of the sensor unit 2 in the above-described each embodiment, it is also possible to use an electrical current.
(8) The above-described embodiments are not independent of each other, and can be combined as appropriate except a case where combination is obviously impossible. Further, it goes without saying that, in the above-described each embodiment, components constituting the embodiment are not always essential except a case where it is particularly and explicitly described that the component is essential, a case where the component is obviously essential in principle, or the like.

CONCLUSION

According to a first aspect described in part or all of the above-described each embodiment, an abnormality diagnosis apparatus includes a sensor unit and a determining unit. The sensor unit includes a first heat flux sensor, a second heat flux sensor, and a thermal buffer disposed between the first heat flux sensor and the second heat flux sensor. The first heat flux sensor outputs a first sensor signal in accordance with a heat flux which passes through the first heat flux sensor. The second heat flux sensor outputs a second sensor signal in accordance with a heat flux which passes through the second heat flux sensor. The determining unit determines whether or not there is an abnormality of a target apparatus on the basis of the first sensor signal and the second sensor signal.

Further, according to a second aspect e, the sensor unit includes a heat sink which is disposed on a side farther from the target apparatus than the second heat flux sensor, and which has predetermined heat capacity.

According to this, even in the case where a surface temperature of the sensor unit changes in a short period of time, it is possible to suppress the change in a temperature of the second heat flux sensor from occurring by heat accumulation and heat transfer at the heat sink. It is therefore possible to improve detection accuracy of the heat flux of the sensor unit.

Further, according to third aspect, the heat capacity of the heat sink is larger than heat capacity of the thermal buffer. According to this, it is possible to make heat flow from the target apparatus toward the heat sink even when a large amount of heat is emitted from the target apparatus. Therefore, it is possible to prevent heat from being confined inside the sensor unit.

Further, according to fourth aspect, the sensor unit includes a heat receiver which is disposed closer to the target apparatus than the first heat flux sensor. The heat capacity of the heat receiver is smaller than the heat capacity of the thermal buffer.

According to this, it is possible to prevent change of the heat flux such as noise which is not a detection target and which occurs in the short term from affecting the first and the second heat flux sensors, by heat accumulation and heat transfer of the heat receiver. Further, it is possible to detect change of the heat flux emitted from the target apparatus which is a detection target by the sensor unit by setting the heat capacity of the heat receiver small.

Further, according to fifth aspect, in the sensor unit, the first heat flux sensor and the second heat flux sensor are arranged so that polarities of the first sensor signal and the second sensor signal become opposite with respect to each other when a heat flux from the target apparatus sequentially passes through the first heat flux sensor and the second heat flux sensor. The first heat flux sensor and the second heat flux sensor are electrically connected in series.

According to this, the sensor unit can output a sensor signal which is a combined signal of the first sensor signal and the second sensor signal. It is therefore possible to eliminate necessity of processing of calculating a sum of the first sensor signal and the second sensor signal.

Further, according to sixth aspect, each of the first heat flux sensor and the second heat flux sensor includes a film-like insulating substrate having flexibility, a plurality of first thermoelectric members and a plurality of second thermoelectric members. The plurality of first thermoelectric members and the plurality of second thermoelectric members are connected such that the first thermoelectric members and the second thermoelectric members are alternately connected in series. The first heat flux sensor is connected to the second heat flux sensor via a bent-shaped portion including an insulating material.

According to this, it is possible to eliminate the necessity of an external wiring for connecting the first heat flux sensor and the second heat flux sensor.

What is claimed is:

1. An abnormality diagnosis apparatus which makes a diagnosis regarding an abnormality of a target apparatus, the abnormality diagnosis apparatus comprising:
   a sensor unit provided at the target apparatus and configured to detect a heat flux which flows outward from the target apparatus; and
   a determining unit configured to detect an abnormality of the target apparatus, wherein
   the sensor unit includes:
   a first heat flux sensor,
   a second heat flux sensor disposed on a side farther from the target apparatus than the first heat flux sensor is, and
   a thermal buffer disposed between the first heat flux sensor and the second heat flux sensor and having a predetermined heat capacity, wherein
   the first heat flux sensor outputs a first sensor signal in accordance with a heat flux which passes through the first heat flux sensor from the target apparatus side toward the thermal buffer side,
   the second heat flux sensor outputs a second sensor signal in accordance with a heat flux which passes through the second heat flux sensor from the thermal buffer side toward an opposite side to the thermal buffer side, and
   the determining unit determines whether or not there is an abnormality of the target apparatus on a basis of the first sensor signal and the second sensor signal.

2. The abnormality diagnosis apparatus according to claim 1, wherein
   the sensor unit includes a heat sink which is disposed on a side farther from the target apparatus than the second heat flux sensor and which has predetermined heat capacity.

3. The abnormality diagnosis apparatus according to claim 2, wherein
   the heat capacity of the heat sink is larger than the heat capacity of the thermal buffer.

4. The abnormality diagnosis apparatus according to claim 1, wherein
   the sensor unit includes a heat receiver disposed closer to the target apparatus than the first heat flux sensor is, and
   heat capacity of the heat receiver is smaller than the heat capacity of the thermal buffer.

5. The abnormality diagnosis apparatus according to claim 1, wherein
   the first heat flux sensor and the second heat flux sensor in the sensor unit are arranged so that polarities of the first sensor signal and the second sensor signal become opposite with respect each other when a heat flux from the target apparatus sequentially passes through the first heat flux sensor and the second heat flux sensor, and
   the first heat flux sensor and the second heat flux sensor are electrically connected in series.

6. The abnormality diagnosis apparatus according to claim 5, wherein
   each of the first heat flux sensor and the second heat flux sensor includes:
   a film-like insulating substrate formed of at least an insulating material and having flexibility;
   a plurality of first thermoelectric members formed on the insulating substrate and formed of a thermoelectric material; and
   a plurality of second thermoelectric members formed on the insulating substrate and formed of a thermoelectric material different from the thermoelectric material of the first thermoelectric members, wherein the plurality of first thermoelectric members and the plurality of second thermoelectric members are connected such that the first thermoelectric members and the second thermoelectric members are alternately connected in series, and the first heat flux sensor is connected to the second heat flux sensor via a bent-shaped portion including the insulating material.

* * * * *